United States Patent [19]

Dobrez et al.

[11] Patent Number: 5,763,377
[45] Date of Patent: Jun. 9, 1998

[54] COMPOSITIONS AND METHODS FOR REMOVING TITANIUM DIOXIDE FROM SURFACES

[75] Inventors: Daniel J. Dobrez, Frankfort; Mark R. Lalinsky, Tinley Park, both of Ill.; Robert J. Rybarski, Demotte, Ind.

[73] Assignee: Dober Chemical Corporation, Midlothian, Ill.

[21] Appl. No.: 665,280

[22] Filed: Jun. 17, 1996

[51] Int. Cl.⁶ .............................. C09D 9/00; C09D 9/02; C09D 9/04; C11D 9/00
[52] U.S. Cl. .................... 510/201; 510/202; 510/203; 510/206; 510/212; 510/499
[58] Field of Search ........................... 510/218, 201, 510/202, 203, 206, 212, 499

[56] References Cited

U.S. PATENT DOCUMENTS

| | | | |
|---|---|---|---|
| 2,861,015 | 11/1958 | Simon | 134/3 |
| 3,553,015 | 1/1971 | Dohogne | 134/2 |
| 3,690,949 | 9/1972 | Ng | 134/2 |
| 4,292,090 | 9/1981 | Chao | 134/2 |
| 4,591,391 | 5/1986 | Shimizu et al. | 134/22.17 |
| 4,731,126 | 3/1988 | Dixit et al. | 134/38 |
| 4,832,868 | 5/1989 | Schmid et al. | 252/356 |
| 4,921,629 | 5/1990 | Malihi et al. | 252/170 |

FOREIGN PATENT DOCUMENTS 0209071  1/1987  European Pat. Off. .

*Primary Examiner*—Mukund J. Shah
*Assistant Examiner*—Tamthom T. Ngo
*Attorney, Agent, or Firm*—Frank J. Uxa

[57] ABSTRACT

Methods and compositions useful for removing a titanium dioxide-containing material located on a surface, for example, a surface of a piece of process equipment, are disclosed. In one embodiment, the present methods provide for contacting the titanium dioxide-containing material located on the surface with a composition comprising at least about 20% by weight of water, an acid component in an amount effective to reduce the adhesion between the titanium dioxide-containing material and the surface; and an organic component in an amount effective to disperse the titanium dioxide-containing material in the composition.

11 Claims, No Drawings

COMPOSITIONS AND METHODS FOR REMOVING TITANIUM DIOXIDE FROM SURFACES

BACKGROUND OF THE INVENTION

This invention relates to removing titanium dioxide from surfaces. More particularly, this invention relates to compositions and methods for removing titanium dioxide-containing materials from surfaces, for example, of processing equipment.

Titanium dioxide is a very useful additive, for example, coating, in the food, pharmaceutical, cosmetic and related industries. Process equipment, such as vessels, coaters, piping and the like, is used in providing titanium dioxide to various products.

Over a period of time, such processing equipment becomes heavily coated with such titanium dioxide-containing material. Periodically, this process equipment must be cleaned in order to perform effectively. In particular, the titanium dioxide-containing material must be removed from the surfaces of the equipment in order that the equipment can perform its function effectively and efficiently. In addition, because the equipment is often used in the pharmaceutical and/or food industries, the cleaning operation itself must be effective to remove all of the titanium dioxide-containing material, and must be approved, for example, by the U.S. Food and Drug Administration, for use in the pharmaceutical and/or food industries. Such cleaning operations must also be cost effective.

Prior titanium dioxide removal operations have involved the use of alkaline cleaners. However, such cleaners have been unable to completely remove the titanium dioxide from the surfaces of the process equipment. This is particularly disadvantageous since the cleaning operations, particularly in the food and pharmaceutical industries, are subject to sophisticated validation procedures to insure that the equipment is sufficiently clean. In order to achieve this degree of cleanliness, costly measures have had to be implemented.

It would be advantageous to provide compositions and methods for removing such titanium dioxide-containing materials from process equipment which are effective and efficient in removing the materials and are cost effective.

SUMMARY OF THE INVENTION

New compositions and methods useful for removing a titanium dioxide-containing material located on a surface, for example, the surface of process equipment, have been discovered. The present compositions and methods provide a very useful and effective system for removing such titanium dioxide-containing materials. For example, it has been found that the use of selected materials, as described herein, in relatively low, cost effective concentrations in an aqueous medium, very effectively and efficiently and substantially completely remove titanium dioxide-containing materials from the surfaces of equipment. Thus, the present invention provides a very performance and cost effective approach to removing such material. The degree of removal preferably is sufficiently high so that the criteria set by validation procedures used to determine equipment cleanliness are met with no further steps. The present compositions and methods are straightforward in chemical makeup and practice.

In one broad aspect, the present invention provides methods for removing a titanium dioxide-containing material located on a surface, for example, an interior surface of a piece of processing equipment. These methods comprise contacting the titanium dioxide-containing material located on the surface with a composition comprising at least about 20% by weight of water, preferably at least a major amount (i.e., at least about 50%) by weight of water, an acid component in an amount effective to reduce the adhesion between the titanium dioxide-containing material and the surface, and an organic component in an amount effective to disperse the titanium dioxide-containing material in the composition.

The compositions useful in the present methods are new and provide substantial and unexpected benefits, as described herein, and are, therefore, within the scope of the present invention.

Without wishing to limit the invention to any particular theory of operation, it is believed that the acid nature of the present compositions, preferably having pH's in the range of about 5 or less, more preferably in the range of about 1 to 4, is effective to reduce the adhesion between the titanium dioxide-containing material and the surface and/or to facilitate removing the titanium dioxide-containing material from the surface. The organic component is believed to act to disperse the titanium dioxide-containing material in the composition and/or to facilitate removing the titanium dioxide-containing material from the surface. The organic component is, in addition, believed to be effective in inhibiting, or even preventing, the redeposition of the titanium dioxide-containing material on the surface. In any event, the present compositions and methods have unexpectedly been found to very effectively remove titanium dioxide-containing materials from processing equipment surfaces, preferably sufficiently so as to meet the criteria of the most rigorous equipment cleanliness validation procedures, for example, such as those set forth by U.S. Food and Drug Administration, for the food and pharmaceutical industries.

These and other aspects and advantages of the present invention will become apparent in the following detailed description and claims in which like parts bear like reference numerals.

DETAILED DESCRIPTION OF THE INVENTION

Titanium dioxide is useful, for example, in coatings, in food products, medications and the like materials for human and animal consumption. In making such products, the process equipment used often becomes heavily coated with the titanium dioxide-containing materials. As part of the routine cleaning operation, the piece of equipment in question is taken out of service and processed to remove the titanium dioxide-containing material located on the surfaces, for example, the inside or interior surfaces, of the equipment.

The present invention provides compositions and methods useful to remove such titanium dioxide-containing materials from the surfaces of process equipment.

The titanium dioxide-containing materials removed in accordance with the present invention may be titanium dioxide itself or a combination or mixture of components including titanium dioxide. For example, titanium dioxide may be applied or added to a medication or food product together with one or more other components useful to provide an independent benefit or benefits to the product and/or to facilitate the application of titanium dioxide to the product. Examples of such other components include plasicizers, colorants, lubricants, fillers and the like. Such other components include those conventionally used with titanium dioxide in the production of products, such as those described herein.

Although the titanium dioxide may be present as a mixture with one or more other components, the titanium dioxide itself is believed to have been particularly difficult to remove from process equipment surfaces in the past. The present invention has as a primary object the removal, preferably the substantially complete removal (that is the removal of at least about 90%, more preferably at least about 95% and still more preferably at least about 99% of the titanium dioxide originally located on the surface), of titanium dioxide located on a surface.

In one embodiment of the present invention, methods for removing such titanium dioxide-containing materials located on a surface comprise contacting this material with a composition containing at least about 20% by weight, preferably at least about 50% by weight, of water, for example, city or tap water, preferably such water which has been softened (that is, treated to reduce hardness); an acid component in an amount effective to provide the composition with a pH of about 4 or less; and an organic component in an amount effective to disperse the titanium dioxide-containing material in the composition.

The acid component may be any suitable such component which is effective to provide the composition with the desired pH and/or which functions as described elsewhere herein. The acid component may be selected from mineral acids, organic acids and mixtures thereof, and may be naturally occurring and/or synthetic. Examples of useful acids include, but are not limited to, hydrochloric acid, sulfuric acid, sulfonic acids, nitric acid, phosphoric acid, phosphonic acids, carboxylic acids and the like and mixtures thereof. Particularly useful acid components include, but are not limited to, carboxylic acids having 1 to about 4 or about 6 or about 8 carbon atoms per molecule, substituted counterparts thereof and mixtures thereof. A very useful and effective acid component is hydroxy acetic acid.

The amount of acid component in the present compositions is preferably effective to provide the composition with the desired pH. Thus, the amount of acid component depends on many factors, for example, on the specific acid component being employed or on the pH desired for the composition. The amount of acid component preferably is in the range of about 0.5% to about 40% or more by weight of the composition.

As noted above, the organic component preferably comprises an amine salt of a carboxylic acid. Often this salt is produced by reacting an amine with a carboxylic acid. The amine preferably has at least one primary amino group. In addition, the amine can, and preferably does, include more than one amino groups, for example, a primary amino group and a secondary amino group. In a particularly useful embodiment, the amine has the following formula:

wherein each R is independently selected from the group consisting of H, monovalent hydrocarbyl radicals and substituted counterparts thereof, $NH_2$ and $NHR^1$, with $R^1$ being selected from monovalent hydrocarbyl radicals and substituted counterparts thereof, provided that at least 1, and preferably 2 or more than 2, of the R groups is selected from $NH_2$ and $NHR^1$, and x is an integer in the range of 0 to about 10 or about 20 or more, more preferably in the range of 0 to 1 or 2 or about 3. Examples of monovalent hydrocarbyl radicals from which R and $R^1$ can be chosen include alkyl, alkenyl, aryl, aralkyl, aralkylene, alkaryl, aralkenyl, alkenaryl and substituted counterparts thereof. The monovalent hydrocarbyl radicals from which R and $R^1$ are selected are preferably aliphatic. Each such monovalent hydrocarby radical preferably has 1 to about 30 or more carbon atoms. Particularly useful examples of such monovalent hydrocarbyl radicals include ethyl, propyl, butyl, hexyl, octyl, decyl, dodecyl, tallowalkyl and the like radicals.

As used herein, the term "substituted counterpart" means any of the presently useful hydrocarbyl radicals, for example, included in the presently useful acid components and organic components, in which at least one of the H groups is replaced by a substituent group containing an element other than carbon and hydrogen, such as halogen, sulfur, oxygen, phosphorus, nitrogen and the like. Such substituent groups should be such as to not substantially interfere with the functioning, effectiveness and characteristics of the acid component and/or organic component in the present invention.

A particularly useful amine is N-tallowalkyl trimethylene diamine.

Any of various carboxylic acid components can be used to form the presently useful organic component. Such components include the carboxylic acids themselves, acid salts of such carboxylic acids and mixtures thereof. Such carboxylic acids include at least one carboxylic acid functionality and preferably have 1 to about 30 carbon atoms, more preferably about 3 or about 10 to about 24 or about 30 carbon atoms, per molecule. The carboxylic acid preferably is unsaturated, that is includes at least one carbon-carbon double bond.

A particularly useful carboxylic acid from which the amine salt is derived is oleic, acid.

Preferably, the amine salt is a poly salt, that is two or more than 2 of the H's bonded directly to amino nitrogen atom or atoms of the amine are reacted with carboxylic acid molecules. A very useful organic component is selected from N-(tallowalkyl)-1,3-propanediamine dioleates and mixtures thereof, such as the material sold by Akzo Nobel Chemicals Inc. under the trademark Duomeen TDO.

The specific amount of the organic component included in the present compositions is not critical to the present invention and may vary depending, for example, on the specific organic component being employed and the specific titanium dioxide-containing material to be removed. However, the organic component should be chosen so that the amount used is cost effective. Thus, either the amount of organic component should be relatively minor (compared to the water component) and/or the cost per unit of the organic component should be relatively low. Based on present costs and performance characteristics of commercially available organic components, it is preferred that the organic component be included in the compositions used to remove the titanium dioxide-containing material from the equipment surfaces in the range of about 0.01% to about 10% by weight, more preferably in the range of about 0.05% or about 0.1% to about 5% by weight of the composition.

The present compositions may, and preferably do, include, at least one additional component to provide a beneficial property or combination of beneficial properties which allow the present compositions and/or methods to be more effective and/or more efficient in removing titanium dioxide-containing materials from surfaces. Any suitable additional component may be employed provided that it functions as described herein and has no undue detrimental effect on the present compositions and methods and the surfaces being cleaned. Examples of such useful additional components include metal chelating components, surfactant components, coupling components, antifoam components, odorant components, colorant components and the like. If one or more of such additional components is present, it is present in an amount effective to obtain or provide the desired property or result, that is an effective amount. The specific amount of each additional component included in the present compositions is not critical to the present invention and varies depending on several factors, for example, the specific additional component being used, the specific composition being employed, and the specific property to be obtained.

The metal chelating component is effective to assist or facilitate maintaining the titanium dioxide-containing material in the composition after it is removed from the surface, so that redeposition of this material on the surface is further inhibited. Examples of useful metal chelating or sequestering components include EDTA; various carboxylic acids, such as citric acid, tartaric acid, gluconic acid and the like; various other acids such as sulfonic acids; and the like and mixtures thereof. Preferably, the metal chelating component is present in an amount in the range of about 0.01% or about 0.05% to about 2% or about 5% by weight of the composition.

The surfactant component is effective to enhance the ability of the composition to wet the titanium dioxide-containing material on the surface. In other words, the surfactant component facilitates intimate contacting between this titanium dioxide-containing material and the present composition. Preferably, the surfactant component is nonionic and/or anionic. Examples of useful surfactant components include linear alcohol alkoxylates, poly (oxyethylkene/polyoxypropylene) monohexyl ether (as well as the corresponding monooctyl ether and monodecyl ether and combinations of any two or all three of these ethers) alkyl phenol alkoxylates, such as octyl phenol ethoxylates and nonyl phenol ethoxylates, hydrocarbyl substituted sulfonic acids, such as dodecyl benzene sulfonic acid, and the like and mixtures thereof. Specific surfactants include: those sold by Huntsman under the trademarks Surfonic N-95 and Surfonic N-40; that sold by Olin under the trademark Polytergent SLF-18; and those sold by Rohm and Haas Company under the trademarks Triton X-15, Triton X-35, Triton X-45, Triton X-114, Triton X-100, Triton X-102 and triton X-165. Preferably, the surfactant component is present in an amount in the range of about 0.1% or about 0.5% or about 5% or about 20% by weight of the composition.

A very useful surfactant component in the present invention is selected from one or more of the poly (oxyethylene/polypropylene) monohexyl, monooctyl and monodecyl ethers. In one useful embodiment, at least a minor amount, for example, on the order of about 5% to about 30%, by weight of the total surfactant component is selected from alkyl phenol alkoxylates. Such alkoxylates, and in particular the alkyl, e.g., nonyl, phenol groups, have been found to be very sensitive to detection, that is are relatively easy to accurately detect the presence of. Thus, a piece of process equipment can be cleaned and rinsed and the final rinse fluid is monitored for the presence of such alkoxylates. If the concentration of alkoxylates in the final rinse fluid is below a set limit, the equipment is verified or validated to be acceptably clean. If the concentration of alkoxylates is too high, additional cleaning and/or rinsing step or steps must be undertaken before the equipment can be certified to be clean and ready to be put back into service.

The coupling component is effective to enhance the compatibility, for example, the miscibility or solubility, of the various other components in the present compositions. Such coupling components often include both polar portions, for example, hydroxyl-containing groups, and nonpolar portions, for example, organic groups. Examples of useful coupling components include alcohols, glycols, glycol ethers and the like and mixtures thereof. A particularly useful coupling component in the present invention is isopropyl alcohol. Preferably, the coupling component is present in an amount in the range of about 0.05% or about 0.2% to about 5% or about 10% of the composition.

The antifoam component is effective to inhibit or even prevent the formation of foam during use of the present compositions. Silicon-containing materials, commonly sold as antifoam agents, are very effective in the present invention. Preferably, the antifoam component is present in an amount in the range of about 0.001% to about 0.5% by weight of the composition.

The present compositions may be derived from concentrates, for example, by combining water and a concentrate or concentrates. These concentrates, which include a liquid medium, preferably water, and relatively large concentrations of the active components are within the scope of the present invention. Such concentrates preferably include at least about 20% by weight of water; and acid component, such as about 10% to about 45% by weight of hydroxy acetic acid, so that the pH of the concentrate is about 4 or less; and an organic component, such as about 0.5% to about 5% by weight of one or more N-(tallowalkyl) -1,3-propanedamine dioleates. In certain instances, for example, when commercially available materials are used as components of the present compositions/concentrates, the active material is present in a mixture, such as a solution, with an inert component or diluent. The specific amounts of the various components of the present compositions noted above refer to the amount of the active material without considering any inert component or diluent.

The present compositions are preferably prepared by blending together the various components. For example, the acid component is blended into the water. The metal chelating component, surfactant component, coupling component, organic component, additional surfactant component and antifoam component are sequentially added to this mixture. If a concentrate is formed, it can be diluted with water for use, as desired.

The present compositions contact the titanium dioxide-containing material located on the surface of equipment at conditions effective to remove such material. Although ambient or room temperature conditions can be employed, it is preferred to use relatively elevated temperatures, more preferably in the range of about 50° C. to about 90° C. during such contacting. In order to obtain such elevated temperatures it is desirable to pass the composition through a heat exchanger prior to introducing the composition into the equipment to be cleaned.

The contacting times vary greatly depending, for example, on the specific composition and contacting conditions being employed and on the specific removal application involved. Preferably, such contacting occurs for a time in the range of about 30 seconds or about one minute to about 1 hour or about 2 hours. In addition, the composition can be used on a once-thru basis, that is the composition is passed into the equipment to be cleaned only one time, or can be, and preferably is, recirculated or recycled back through the equipment to be cleaned.

In one embodiment, the composition is contacted with the titanium dioxide-containing material on the surface so as to wet or soak the titanium dioxide-containing material with the composition. This is preferably done using a low impact spray or stream of the composition, that is a spray or stream of the composition which contacts the titanium dioxide-containing material without sufficient force, for example, at a pressure of less than about 20 or about 30 psi, to mechanically remove the material from the surface. This technique has been found to be very effective to remove titanium dioxide-containing materials from surfaces, particularly when used in combination with a water rinse of the surface after the above-noted contacting. This water rinse preferably employs water at elevated temperatures, for example, in the range of about 50° C. to about 90° C., for a period of time in the range of about 30 seconds or about 1 minute to about 1 hour or about 2 hours. One very useful way to provide this wetting or soaking, low impact contacting is to use a static spray nozzle device or spray ball, such as the device sold by Toftejorg under the trademark Sani-Midget.

In another embodiment, the composition is contacted with the titanium dioxide-containing material on the surface to impact this material on the surface with sufficient force, for example, at a pressure in excess of about 30 or about 50 psi, to mechanically remove at least a portion of the titanium dioxide-containing material from the surface. This technique is also very effective when used in combination with a water rinsing step, as described elsewhere herein. One very useful way to provide this high force or impact contacting is to use a dynamic spray nozzle device or spray ball, such as the device sold by Toftejorg under the trademark TZ-89. In addition, a water rinsing step, as described herein, can be used in combination with the high impact contacting.

Additionally, the wetting or soaking contacting and the high force or impact contacting, described separately herein, can be used together, for example, in combination with the water rinsing step as described herein. The wetting or soaking contacting can occur before, after or during the high force or impact contacting. Very effective results are obtained if these two types of contacting occur simultaneously. The water rinsing step preferably occurs after the composition contacting step or steps.

Electric conductivity measurements of the composition and the rinse medium may be employed, for example, to maintain the "strength" of the composition used for removing the titanium dioxide-containing material, particularly when the composition is being used in the "recycle" mode, and to validate the cleanliness of the equipment after the equipment has been cleaned.

In one embodiment, the electric conductivity of the composition is monitored as it exits the equipment to be cleaned. One can determine, at least semi-quantitatively, the "strength" of this composition, that is the ability of the composition to remove further titanium dioxide-containing material based upon the electric or electrical conductivity of the composition. Generally, all other things being equal, the ability of the composition to remove titanium dioxide-containing material is directly proportional to, that is increases with increases in and decreases with decreases in, the electrical conductivity of the composition. By monitoring the electrical conductivity, and thus the "strength" of this composition, one can determine whether or not active material concentrate needs to be added to the composition being used. Preferably, sufficient active material concentrate is added to the recirculating composition so as to maintain the "strength" of the composition at a certain level. This electrical conductivity monitoring and composition strength controlling function is preferably accomplished by an electronic controller, such as that included in the system sold by Dober Chemical Corporation under the trademark Chematic C.I.P®.

High pressure liquid chromatography (HPLC) is preferably used to validate the cleanliness of a piece of equipment after treatment with the present compositions. After the treatment, preferably including rinsing, an area of the treated equipment surface is swabbed to collect any cleaning composition residue. This residue is then dissolved in a suitable solvent and the residue-containing solvent is analyzed by HPLC. The cleanliness of the piece of equipment is validated when the HPLC analysis is within acceptable limits.

After the piece of equipment has been validated as being clean, it can be returned to service, for example, in the food or pharmaceutical industry to coat products with a titanium dioxide-containing material.

The following non-limiting examples illustrate certain aspects of the present invention.

The following materials were used, as indicated hereinafter, in performing the tests:

Material A: soft tap water

Material B: hydroxyacetic acid

Material C: propoxy butanol

Material D: sodium lauryl sulfate, sold by Stepan Company under the trademark CS-460.

Material E: nonyl phenol ethoxylate, sold by Huntsman under the trademark Surfonic N-40.

Material F: nonyl phenol ethoxylate, sold by Huntsman under the trademark Surfonic N-95. Differs in molar proportions from Material E.

Material G: dodecyl benzene sulfonic acid

Material H: poly (oxyethylene/polyoxypropylene) $C_6$–$C_{10}$ alkyl ether sold by Olin under the trademark Polytergent SLF-18.

Material I: aromatic phosphate ester sold by PPG Industries, Inc. under the trademark Maphos 8135.

Material J: isopropyl alcohol

Material K: N-(tallowalkyl)-1,3-propanediamine dioleates sold by Akzo Nobel Chemicals, Inc. under the trademark Duomeen TDO.

Material L: Silicon-containing antifoam material sold by Dow Corning under the trademark Q2-3183A.

EXAMPLE 1

The following working composition was prepared by blending the components together in the order listed:

| Material | Wt. % |
| --- | --- |
| A | 32 |
| B | 47 |
| C | 9.5 |
| D | 1 |
| F | 4 |
| H | 6 |
| I | 0.5 |

This working composition was diluted with soft tap water so that the final teat composition contained 10% by volume of the working composition.

A slurry containing titanium dioxide and propylene glycol was prepared. A stainless steel panel was dipped in this slurry, removed from the slurry and allowed to air dry. The dried panel had a coating of titanium dioxide.

This coated panel was immersed in a quantity of the test composition at 80° C. for 15 minutes. The panel was removed from the test composition, gently rinsed with water and allowed to dry.

A fine film of titanium dioxide remained on the panel. This film was easily removed (wiped away) by hand.

EXAMPLE 2

Example 1 was repeated except that the coated panel was immersed in the test composition for 30 minutes.

Results similar to those obtained in Example 1 were observed except that the fine film of titanium dioxide was somewhat less noticeable.

EXAMPLE 3

Example 1 was repeated except that the test composition contained 20% by volume of the working composition and the coated panel was immersed in the test composition for 30 minutes.

Results similar to those obtained in Example 1 were observed except that the fine film of titanium dioxide was somewhat less noticeable.

EXAMPLE 4

The following working composition was prepared by blending the components together in the order listed:

| Material | Wt. % |
| --- | --- |
| A | 32 |
| B | 42 |
| D | 4 |
| F | 1 |
| G | 6 |
| J | 11.5 |
| K | 3.5 |

This working composition is diluted with soft tap water so that the final composition contains 10% by volume of the working composition.

A coated panel is provided as in Example 1.

This coated panel is immersed in a quantity of the test composition at 80° C. for 15 minutes. The panel is removed from the test composition, gently rinsed with water and allowed to dry.

No titanium dioxide is observed on the panel after this processing.

EXAMPLE 5

The following working composition was prepared by blending the following components together:

| Material | Wt. % |
| --- | --- |
| A | 47 |
| B | 34 |
| E | 1 |
| G | 1 |
| H | 10 |
| J | 5 |
| K | 2 |

A coated panel is provided as in Example 1.

This coated panel is immersed in a quantity of the test composition at 80° C. for 15 minutes. The panel is removed from the test composition, gently rinsed with water and allowed to dry.

No titanium dioxide is observed on the panel after this processing.

EXAMPLE 6

The following working composition was prepared by blending the following components together in the order listed:

| Material | Wt. % |
| --- | --- |
| A | 47 |
| B | 33.95 |
| E | 1 |
| G | 1 |
| H | 10 |
| J | 5 |
| K | 2 |
| L | 0.05 |

The working composition was diluted with tap water so that the final composition contained 10% by volume of the working composition.

A mixture containing gelatin and titanium dioxide was obtained. This mixture is similar to that used to coat pharmaceutical tablets, for example, aspirin tablets. This mixture was used to coat the inner surfaces of a stainless steel tank. The coating was dried.

A 100 gallon quantity of the final composition was placed in a separate tank. Plumbing connections were made so that the final composition was pumped through a heat exchanger, to heat the final composition to 80° C., and then to a spray device located in the coated tank. The composition after being sprayed in the caoted tank is passed back to the other tank. The composition was recirculated between the two tanks throughout the cleaning period.

The cleaning period was 15 minutes. The flowrate of the composition was 17.5–18.1 gal./minutes at a pressure of 16 psi. The spray system was one which soaked or cascaded down the coated surface, rather than impacting the coated surfaces with sufficient force to mechanically remove a major portion of the coating from the surface.

During the cleaning step, no evidence of foam formation was apparent.

After the cleaning step, the coated tank was visually inspected. It appeared that streaks of whitish material were present where the composition had drained from the tank. This whitish material is believed to be the gelatin material dispersed in the composition.

After this cleaning period, water at 80° C. and 10 psi was sprayed into the tank which had been coated, and continuously removed from the tank, for about 8 minutes. This rinse step used the water on a once thru basis.

After rinsing, the tank (originally coated) was visually inspected and found to be thoroughly clean. No residue was seen. These results indicate that the coating material was removed by the action of the cleaning composition, rather than by mechanical action caused by impacting the coated surface with substantial force.

While this invention has been described with respect to various specific examples and embodiments, it is to be understood that the invention is not limited thereto and that it can be variously practiced within the scope of the following claims.

What is claimed is:

1. A method for removing a titanium dioxide-containing material located on a surface comprising:
    contacting said titanium dioxide-containing material located on said surface with a composition comprising at least about 20% by weight of water, an acid component in an amount effective to reduce the adhesion between said titanium dioxide-containing material and said surface; and an organic component in an amount effective to disperse said titanium dioxide-containing material in said composition.

2. The method of claim 1 wherein said organic component comprises an amine salt of a carboxylic acid.

3. The method of claim 1 wherein said organic component comprises the reaction product of an amine and an unsaturated carboxylic acid having between about 8 to about 30 carbon atoms.

4. The method of claim 1 wherein said organic component is selected from the group consisting of N-(tallowalkyl)1,3-propanediamine dioleates and mixtures thereof.

5. The method of claim 1 wherein said organic component is present in an amount in the range of about 0.1% to about 5% by weight of said composition.

6. The method of claim 1 wherein said composition has a pH in the range of about 1 to about 4.

7. The method of claim 1 wherein said acid component comprises hydroxy acetic acid.

8. The method of claim 1 wherein said contacting comprises causing said composition to impact said titanium dioxide-containing material located on said surface with sufficient force to mechanically remove at least a portion of said titanium dioxide-containing material from said surface.

9. The method of claim 1 wherein said contacting comprises causing said composition to wet said titanium dioxide-containing material located on said surface.

10. The method of claim 8 wherein said contacting further comprises causing said composition to wet said titanium dioxide-containing material located on said surface.

11. The method of claim 1 wherein said composition includes an effective amount of a metal chelating component, an effective amount of a surfactant component, an effective amount of a coupling component, and an effective amount of an antifoam component.

* * * * *